(12) United States Patent
Sankaralingam et al.

(10) Patent No.: US 10,754,744 B2
(45) Date of Patent: Aug. 25, 2020

(54) METHOD OF ESTIMATING PROGRAM SPEED-UP IN HIGHLY PARALLEL ARCHITECTURES USING STATIC ANALYSIS

(71) Applicant: Wisconsin Alumni Research Foundation, Madison, WI (US)

(72) Inventors: Karthikeyan Sankaralingam, Madison, WI (US); Newsha Ardalani, Madison, WI (US); Urmish Thakker, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 806 days.

(21) Appl. No.: 15/070,466

(22) Filed: Mar. 15, 2016

(65) Prior Publication Data

US 2017/0270424 A1   Sep. 21, 2017

(51) Int. Cl.
| | | |
|---|---|---|
| *G06F 11/30* | (2006.01) | |
| *G06F 8/41* | (2018.01) | |
| *G06F 8/75* | (2018.01) | |
| *G06N 5/02* | (2006.01) | |

(52) U.S. Cl.
CPC ............... *G06F 11/30* (2013.01); *G06F 8/42* (2013.01); *G06F 8/443* (2013.01); *G06F 8/75* (2013.01); *G06N 5/025* (2013.01)

(58) Field of Classification Search
CPC ............... G06F 8/42; G06F 8/443; G06F 8/75
See application file for complete search history.

(56) References Cited

U.S. PATENT DOCUMENTS

| | | | | |
|---|---|---|---|---|
| 5,303,357 A | * | 4/1994 | Inoue | G06F 8/452 |
| | | | | 717/160 |
| 8,533,669 B2 | * | 9/2013 | King | G06F 8/41 |
| | | | | 717/111 |
| 8,700,925 B2 | | 4/2014 | Wyatt | |
| 2005/0210225 A1 | * | 9/2005 | Morrow | G06F 9/3844 |
| | | | | 712/239 |
| 2011/0310107 A1 | | 12/2011 | Shiraki | |
| 2012/0221574 A1 | | 8/2012 | Murakami et al. | |
| 2014/0109105 A1 | | 4/2014 | Lee et al. | |
| 2014/0259024 A1 | | 9/2014 | Sridharan et al. | |
| 2015/0007187 A1 | | 1/2015 | Shows | |
| 2015/0052536 A1 | * | 2/2015 | Sah | G06F 9/5083 |
| | | | | 718/105 |

(Continued)

OTHER PUBLICATIONS

Grewe, Dominik et. al, Univ of Edinburgh, UK; A Static Task Partitioning Approach for Heterogeneous Systems Using Open CL J. Knoop (Ed.): LNCS 6601, pp. 286-305, Springer-Verlag Berlin Heidelberg 2011 (Year: 2011).*

(Continued)

*Primary Examiner* — Li Wu Chang
(74) *Attorney, Agent, or Firm* — Boyle Fredrickson, S.C.

(57) ABSTRACT

The amount of speed-up that can be obtained by optimizing the program to run on a different architecture is determined by static measurements of the program. Multiple such static measurements are processed by a machine learning system after being discretized to alter their accuracy vs precision. Static analysis requires less analysis overhead and permits analysis of program portions to optimize allocation of porting resources on a large program.

19 Claims, 3 Drawing Sheets

(56) References Cited

U.S. PATENT DOCUMENTS

2016/0300060 A1* 10/2016 Pike .................... G06F 11/3604
2017/0083338 A1* 3/2017 Burger .................... G06F 9/268

OTHER PUBLICATIONS

Linderman et al. "Towards Program Optimization through Automated Analysis of Numerical Precision", Proc CGO, 2010, pp. 230-237.*

Liu et al.; Performance Prediction for Reconfigurable Processor, In High Performance Computing and Communication 2012 IEEE 9th International Conference on Embedded Software and Systems (HPCC-ICESS), 2012 IEEE, 14th International Conference; pp. 1352-1359, 2012.

Hoste et al.: Performance Prediction based on Inherent Program Similarity; In in PACT, pp. 114-122. ACM Press, 2006., US.

* cited by examiner

METHOD OF ESTIMATING PROGRAM SPEED-UP IN HIGHLY PARALLEL ARCHITECTURES USING STATIC ANALYSIS

STATEMENT REGARDING FEDERALLY SPONSORED RESEARCH OR DEVELOPMENT

This invention was made with government support under 1162215 and 1439091 awarded by the National Science Foundation. The government has certain rights in the invention.

CROSS REFERENCE TO RELATED APPLICATION

--

BACKGROUND OF THE INVENTION

The present invention relates to highly parallel computer architectures such as graphic processing units (GPUs), and in a particular to a method of estimating the degree by which a program will speed-up when ported to a highly parallel architecture, for example, from a different less parallel architecture, using statically measured program characteristics.

Current high-performance computers may employ processor systems having a range of different architectures. One processor system may be in the form of one or more CPUs (computer processing units) each having a general instruction set intended for serial execution of tasks, and another processor system may be a GPU (graphics processing unit) having many hundreds of processing elements and a specialized instruction set intended for parallel execution of tasks, typically associated with graphics processing. Often these two processing systems are combined in the same computer.

The ability of the GPU to handle not only graphic tasks but also generalized computational tasks that can be parallelized, for example, by stream processing, has led to a so-called "heterogeneous processing" in which the GPU handles non-graphics program tasks normally performed by the CPU. In this regard, some programs can experience multiple factors of "speed-up" when moved ("ported") from the CPU to a GPU.

Porting a program from a CPU to a GPU requires substantial restructuring of the software and data organization to match the GPU's many-threaded programming model. Code optimization of such ported programs can be very time-consuming and require specialized tools and expertise. The costs of porting programs to a GPU make it desirable to know if program speed-up will justify the effort before substantial effort is expended. Unfortunately, the performance advantage of such porting is not known until the GPU code has been written and optimized.

U.S. patent application Ser. No. 14/212,711 filed Mar. 14, 2014, hereby incorporated by reference and assigned to the assignee of the present application, describes a system that can estimate the amount of speed-up that can be obtained in a program by moving it between architectures, such as from a CPU to a GPU. This system makes detailed "dynamic" measurements of a target program to be ported, that is measurements taken when the target program is operating on the first architecture (e.g., CPU). The system then applies these dynamic measurements to a machine learning model which can output an estimate of program speed-up when the program is ported to the second architecture (e.g., GPU).

Dynamic measurement, that is, measurements of the program as it is actually executing, can reveal, for example, which way branch conditions are resolved during program execution. When a branch condition has data dependence, meaning that the branch depends on the value of data from main memory, the direction of the branch cannot be determined from static analysis of the program but may require knowledge of values that are not resolved until the program runs.

Knowing how branch conditions are resolved provides information about which instructions are executed and how many times they are executed (for example, in a branch control loop). This latter information in turn reveals the predominant type of instructions that are executed and the amount of main memory access, information that strongly affects how the program will perform on a given architecture type.

While dynamic measurement reasonably appear to be necessary for accurate estimation of the dynamic property of program execution speed when run on a given architecture, such dynamic measurements are not always practical. The software "instrumentation" used to make dynamic measurements can interfere (slow) execution of the programs being measured, interfering with measurement. Implementing the instrumentation to acquire dynamic measurements can require substantial amount of execution time and programmer effort.

SUMMARY OF THE INVENTION

The present invention provides a method of estimating the amount of speed-up that will be obtained in porting a target program between two different computer architectures using static rather than dynamic measurements of the target program. The ability to use static measurements eliminates the overhead of making dynamic measurements, greatly simplifying the assessment process. In addition, the present invention, combined with minimal dynamic analysis, permits separate portions of the program to be individually ranked with respect on their estimated speed-up. In this way, limited resources available for porting a program can be efficiently allocated to portions of the program that will yield the most benefit.

Underlying this invention is the present inventor's recognition that static measurements can provide sufficient insights into dynamic properties for reliable speed-up predictions despite the absence of some foundational dynamic information such as branch probability information and loop trip count for loops. The present invention provides a way of managing the inevitable inaccuracy in using static measurements to obtain dynamic information when those inaccurate static measures are applied to accuracy-sensitive machine learning models.

Specifically then, in one embodiment, the invention provides an electronic computer executing a program stored in non-transitory medium to: (a) perform a static analysis of a target computer program prepared to execute on a first computer architecture to determine static properties of the target computer program selected from a set of static program properties relating to how the target computer program would dynamically execute on a second computer architecture having a different architecture than the first computer architecture. The static properties are then applied to a machine learning model, the machine learning model trained using a training set of programs each having a first optimization for the first computer architecture and a second optimization for the second computer architecture, the training set providing an empirically measured change in execution speed between the first optimization and the second optimization when running on the respective computer architectures and training static properties of the set of static program properties for the first optimization. A speed-up value is output from the machine learning model to a user indicating an expected increase in execution speed of the target computer program when executed on the second computer architecture.

It is thus a feature of at least one embodiment of the invention to permit an estimation of how much a program will speed-up when being adapted for use on a different architecture before making that adaption and without the need for dynamic instrumentation of the program.

The static properties and training static properties maybe discretized corresponding sets of ranges less than five.

It is thus a feature of at least one embodiment of the invention to adapt imperfect approximations of dynamic program qualities captured in static measurements to accuracy sensitive, machine learning systems by using a discretization process to trade off precision for accuracy.

The ranges maybe selected to provide bins holding substantially equal numbers of the measured static properties of the training set of programs.

It is thus a feature of at least one embodiment of the invention to provide a simple method of automatic discretization.

The empirically measured changes in execution speed maybe discretized to a set of ranges less than five.

It is thus a feature of at least one embodiment of the invention to provide a balancing between accuracy and precision in the speed-up measurements applied to machine learning.

The empirically measured changes in execution speed maybe discretized to a user-selected set of ranges selectable by the user and further wherein the speed-up value output to the user is discretized to the user-selected ranges.

It is thus a feature of at least one embodiment of the invention to match the accuracy in handing discretization processes to desired ranges of interest from the user.

The set of static program properties may provide a static indication of memory coalescing in the target program related to an amount of excess external memory.

It is thus a feature of at least one embodiment of the invention to approximate in the estimating process the dynamic effects of memory bandwidth limitations such as reflect the time penalties of acquiring data from an external memory.

The static indication of memory coalescing may assess memory access instructions in a loop according to whether the address of the instruction includes loop invariant terms or loop induction variable-based terms that are not the loop induction variable times a value.

It is thus a feature of at least one embodiment of the invention to find a statically derivable proxy for the dynamic behavior of memory coalescing. By looking at static aspects of memory address calculation, a rough approximation of memory access behavior may be determined.

The static indication of memory coalescing maybe discretized to a binary value.

It is thus a feature of at least one embodiment of the invention to address accuracy problems through the use of coarse discretization.

The multiple static indications may further provide a static assessment of an intensity of arithmetic instructions in the instructions of the target program.

It is thus a feature of at least one embodiment of the invention to capture in the estimation process types of instructions (arithmetic) that can hide memory latency by being executed during memory latency.

The static assessment of the intensity of arithmetic instructions maybe a ratio of arithmetic to memory access instructions.

It is thus a feature of at least one embodiment of the invention to provide a simple static assessment of mitigating factors to memory latency.

The static assessment of an intensity of arithmetic instructions may be discretized to a binary value.

It is thus a feature of at least one embodiment of the invention to moderate accuracy problems with the static approximation of a dynamic property.

The set of static program properties may provide a static indication of branch divergence in the target program related to variation in execution paths between successive executions of a branch instruction.

It is thus a feature of at least one embodiment of the invention to provide a measure of memory accesses which may affect parallel operation on a GPU or the like.

The static indication of branch divergence may assess branch instructions in the loop according to whether the branch conditions are loop invariant terms or based on loop induction variables. Alternatively or in addition, the static indication of branch divergence may assess whether the branch instructions include branch conditions based on access to processor external memory.

It is thus a feature of at least one embodiment of the invention to identify a static proxy for the dynamic behavior of branch divergence.

The set of static programs may further include at least one of assessment of kernel size of the average number of instructions in one thread, available parallelism indicating how many threads can potentially run on the second architecture in parallel, control intensity providing a measure of whether control instructions rely on data from external memory and complex arithmetic ratios indicating the number of complex arithmetic instructions selected from the group of multiplication, division, sine, cosine, floating-point log, floating-point exponent and square root.

It is thus a feature of at least one embodiment of the invention to identify multiple additional static program properties related to the dynamic performance of a program.

The machine learning model may be a random forest classifier.

It is thus a feature of at least one embodiment of the invention to make use of a machine learning system that resists "overfit" allowing it to be used with a limited teaching set.

The random forest classifier may select and combine random forests of binary decision trees.

It is thus a feature of at least one embodiment of the invention to provide a modeling technique that is robust to the inclusion of possibly irrelevant features in the static program properties.

The electronic computer may further include each of the first and second architectures.

It is thus a feature of at least one embodiment of the invention to provide a system that can assist in optimizing programs for its own architecture.

The target computer program may be a portion of a main computer program, and the electronic computer may include the first architecture and further execute the stored program to execute the main program on the first architecture to measure a call hierarchy of different portions of the main program including the target program when the main program is executing on the first architecture. In addition the electronic computer may perform a static analysis of the different portions of the main program to determine static properties of each of the different portions selected from the set of static program properties and apply the static properties of each of the different portions to the machine learning model and provide a comparison of speed-up value from the machine learning model for each of the different portions to a user indicating a relative increase in execution speed of each of the different portions when executed on the second computer architecture.

It is thus a feature of at least one embodiment of the invention to allow a ranking of different portions of the program to determine where resources should best be applied in order to speed the program up on a second architecture.

These particular objects and advantages may apply to only some embodiments falling within the claims and thus do not define the scope of the invention.

DETAILED DESCRIPTION OF THE PREFERRED EMBODIMENT

Figure 1:
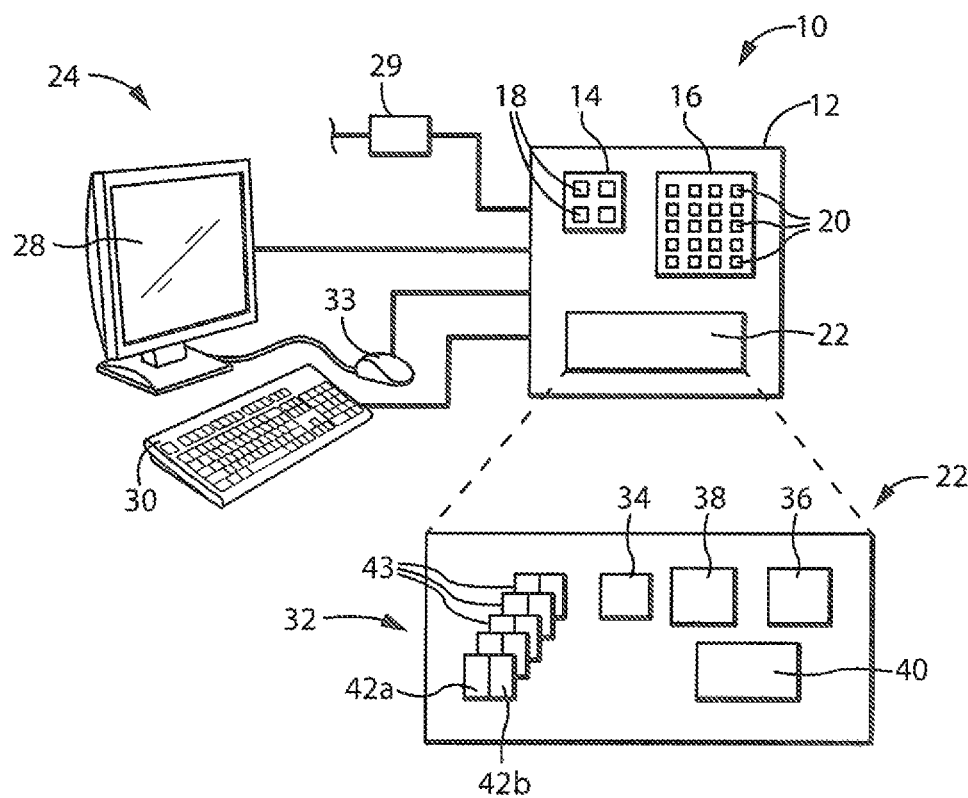
FIG. 1 is a block diagram of a heterogeneous processor that may execute a program for practice of the present invention.

Referring now to FIG. 1, processor system 10 suitable for use with the present invention may include a heterogeneous processor 12 providing generally for a CPU system 14 and a GPU system 16. As is understood in the art, the CPU system 14 may have one or more cores 18 (for example, eight) each of which may execute a general instruction set intended for the execution of serially executed programs. These cores 18 may include current architectural features such as speculative execution, out of order execution and the like.

In contrast to the CPU system 14, the GPU system 16 will provide an architecture presenting a much larger number of computational elements 20 (for example, 100) each executing a specialized instruction set, for example, suitable for graphic processing. The computational elements 20 are configured for vector processing as opposed to the scalar processing intended for the CPU system 14.

The heterogeneous processor 12 may further include a memory system 22 providing data and programs for execution on the CPU system 14 and GPU system 16 as will be discussed below. The memory system 22 may broadly include cache memories, high-speed random access memory and lower speed disk drives and the like but does not include processor registers. In addition, the heterogeneous processor 12 may communicate with external devices 24, for example, a standard user interface of a graphic display screen 28, keyboard 30, cursor control device 33, and a network interface 29.

The memory system 22 may hold a training set 32 of programs that can be executed on both the CPU system 14 and GPU system 16 as will be discussed further below together with an unpaired target program 34 to be tested for speed-up potential. The process of testing the unpaired target program 34 is undertaken by a static evaluation program 36 and in some cases a dynamic profiling program 38 whose operation also will be described below. Each of these programs will generally execute under the environment of an operating system 40 as will be understood to those of ordinary skill in the art.

In the example described below, the processor system 10 will be used to evaluate the unpaired target program 34, for example, as optimized for execution on a "native system" (e.g., the CPU system 14) for possible speed-up when executed on a "target system" (e.g., the GPU system 16). More generally, in some embodiments the processor system 10 may be used to evaluate the unpaired target program 34 optimized for any native system (not necessarily part of the processor system 10) to be ported to any target system (also not necessarily part of the processor system 10) where the native system and target system have different architectures.

Referring still to FIG. 1, the training set 32 consists of multiple pairs 43 of program portions 42a and 42b. Each program portion 42a and 42b has been optimized to run on different of the CPU system 14 and GPU system 16 and on each system to accomplish generally the same function. The optimization of the programs for the different CPU system 14 and GPU system 16 will typically be done manually and these programs culled from published examples.

In one embodiment, both program portions 42a and 42b may be written in C or a variant (e.g., C++) and the algorithm used in each of the program portions 42a and 42b may be similar or identical. The program portions 42a and 42b may be portions of larger programs where sections of the program portion 42a are ported for execution on the GPU system 16. Ideally, however, program portion 42a will have well-defined regions that map to well-defined regions of program portion 42b and these regions will comprise the training sets. In one embodiment a training set 32 of approximately twenty pairs 43 is collected, each pair 43 implementing a different function.

In one embodiment, the training sets may be collected from benchmark suites including Lonestar, per M. Kulkarni, M. Burtscher, C. Casçaval, and K. Pingali, "Lonestar: A suite of parallel irregular programs," in Performance Analysis of Systems and Software, 2009, ISPASS 2009, IEEE International Symposium on, pp. 65-76, IEEE, 2009; Rodinia per S. Che, M. Boyer, J. Meng, D. Tarjan, J. W. Sheaffer, S.-H. Lee, and K. Skadron, "Rodinia: A benchmark suite for heterogeneous computing," in IISWC '09; and nas subset per D. H. Bailey, E. Barszcz, J. T. Barton, D. S. Browning, R. L. Carter, L. Dagum, R. A. Fatoohi, P. O. Frederickson, T. A. Lasinski, R. S. Schreiber, et al., "The nas parallel benchmarks," International Journal of High Performance Computing Applications, vol. 5, no. 3, pp. 63-73, 1991 all hereby incorporated by reference. This material was supplemented with constructed examples using transcendental operations and examples providing programs that are not well suited for reporting to the target system.

Figure 2:
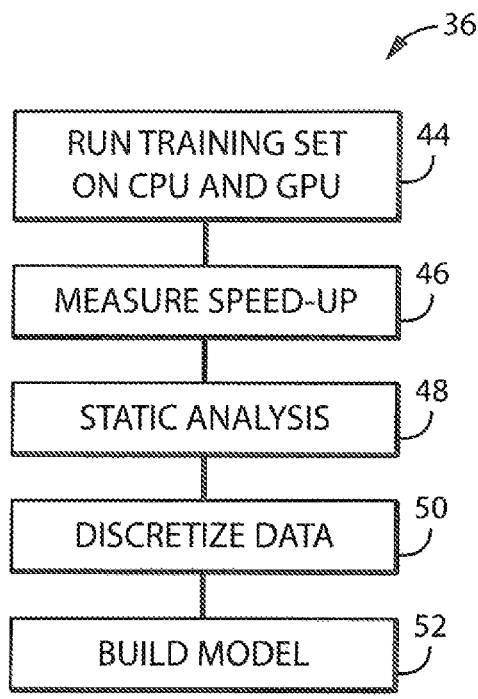
FIG. 2 is a flowchart of the principal steps of developing a machine learning model that will be used in the present invention.

Referring now to FIG. 2, the training sets may be processed, for example, as shown by process block 44, by running program portions 42a on the native system and program portions 42b on the target system for each pair 43. During that execution, the speed of execution of the program portions 42a and 42b on the respective systems is carefully monitored in order to deduce the speed-up in execution on the target system when compared to the speed of execution on the native system. This is indicated by process block 46 for each program pair 43.

The program portion 42a is then subject to static analysis as will be discussed below and as shown by process block 48 to determine a set of static program properties describing static qualities of the program portion 42a. These static program properties are properties that do not require monitoring execution of the program portion 42a on a particular architecture but that can be determined by static analysis or inspection of the program portion 42a. This static analysis does not resolve values accessed from memory or determine the execution control flow such as requires resolution of the direction of various branch instructions that are memory dependent (e.g., access external memory).

These static properties are then discretized as indicated by process block 50, for example, to a binary or ternary value. This discretization of process block 50 will match a discretization used in the analysis of an unpaired target program to be described below.

In one embodiment, the discretization may be performed by analyzing the static program properties extracted from each program portion 42a for each program pair 43 and using an "equal frequency binning" approach, for example, described by S. Kotsiantis and D. Kanellopoulos, in "Discretization techniques: A recent survey," GESTS International Transactions on Computer Science and Engineering, Vol. 32 (1), 2006, pp. 47-58, hereby incorporated by reference. This approach develops k cutpoints (for example, one threshold value in the case of a binary discretization) that separates the range of the static program properties into intervals containing approximately the same number of values. The resulting set of discretized static properties for each program portion 42a describes a single "feature vector".

Also at process block 50, the calculated speed-up for each feature vector is discretized according to the desires of the user, for example, according to a limited set of ranges. For example, the user may be satisfied with knowing only whether the speed-up is in the three ranges of 0-3, 3-10, and 10-∞. Accordingly the speed-up values of the training pairs 43 may be likewise discretized, for example, into a ternary value representing these three ranges and using thresholds provided by the user.

This process of discretization changes high-precision but inaccurate data (static program properties) into low-precision, high accuracy data. This in turn allows an inaccurate proxy for dynamic properties (provided by measured static program properties) to be compatible with machine learning algorithms which are sensitive to inaccuracy. As is generally understood in the art, accuracy in this case refers to the how well the static program properties relate to (and thus predict) speed-up in program performance whereas precision refers to the resolution or granularity of the measurements as opposed to repeatability.

In this step, the training set of feature vectors linked to speedups is processed to remove outliers, that is, identical feature vectors that map to different speedups. This may be done by sorting each feature vector of the training set into a separate bin based on the feature vector. Any feature vector/speed-up pair that is unique within its bin and which doesn't match the majority prediction is discarded.

Referring still to FIG. 2, the result of this measurement of speed-up and discretization is a training set consisting of a training example identified to a program pair 43 and consisting of the discretized values of the static program properties (together forming a feature vector) and the empirically measured speed-up occurring in that program pair 43 between execution on the native and target architectures.

At process block 52, this training set is used to train a machine learning model that will be used to relate the feature vector (of static program properties) to an estimated speed-up for the unpaired target program 34 not part of a program pair 43. In one embodiment, the machine learning model may be a rainforest classifier assembling multiple binary decision trees. A rainforest classifier is described, for example, in A. Liaw and M. Wiener, "Classification and regression by random forest," JML R News, vol. 2, no. 3, pp. 18-22, 2002, hereby incorporated by reference. A rainforest classifier provides an ensemble of many decision trees that reduces problems of "over fit" which can cause a model to have trouble with previously unseen data. The binary decision trees used by the rainforest classifiers are a classification technique that provides a treelike structure of binary tests on input features of the feature vector (e.g., whether the feature value is high or low). Here the term "binary decision tree" may be interpreted broadly to include ternary values. The path through this binary tree from a root to its leaves provides a classification. The binary decision trees may be constructed using an ID3 recursive algorithm.

The result is a machine learning model 54 (shown in FIG. 3) which may receive a feature vector of a target program and provide an output indicating estimated speed-up when the target program is moved from the native architecture to the target architecture. Once the model of process block 52 is complete it may be applied to a given unpaired target program 34 as will now be described.

Figure 3:
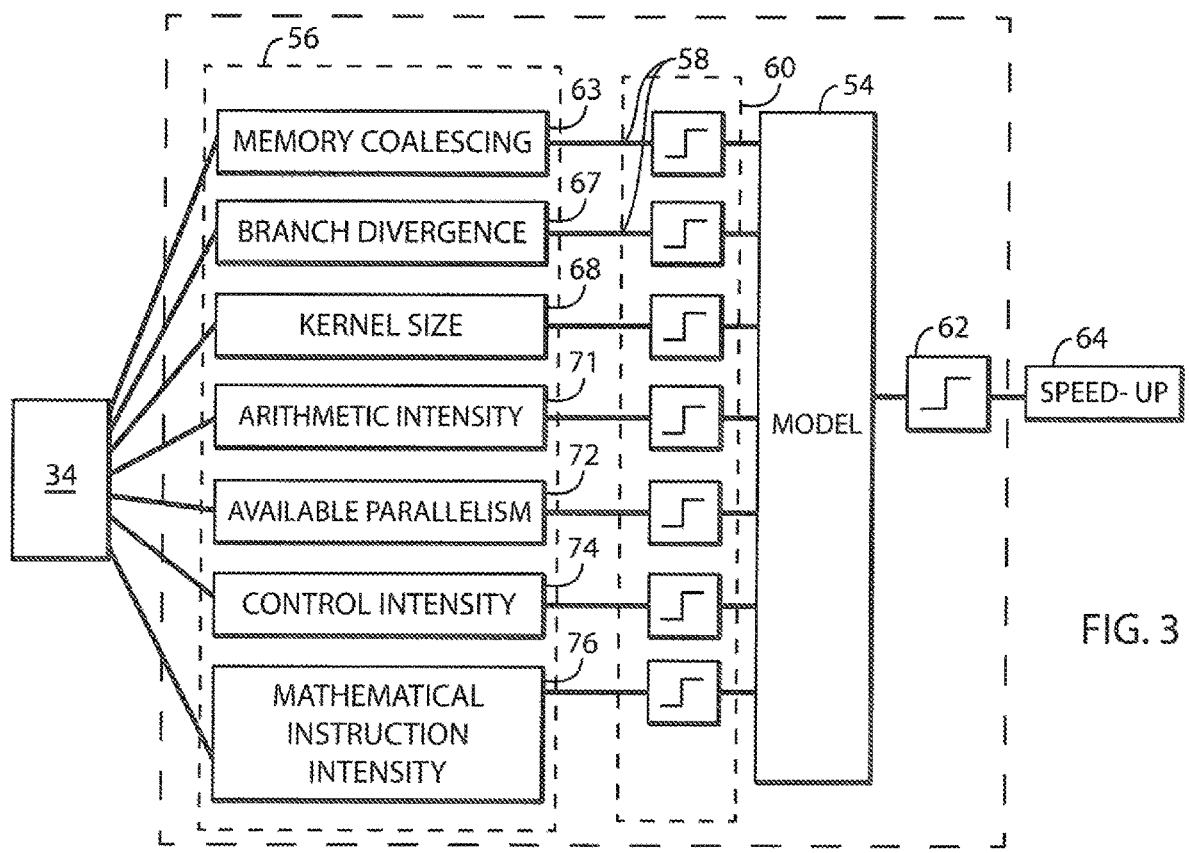
FIG. 3 is a process diagram showing the static analysis and discretization performed by the present invention in applying static measurements to a model developed per FIG. 2.

Referring now to FIG. 3, in overview, in the present invention, the unpaired target program 34 will first be analyzed by a static analyzer 56 forming the same analysis as provided in process block 48 of FIG. 2. The result of this static analysis produces a set of static program properties 58 each separately discretized by discretizer 60 using thresholds established at process block 50 of FIG. 2. The outputs of the discretizer 60, in turn, are provided to the model 54 and the output of model 54 is discretized by discretizer 62 using the thresholds developed at process block 50. The result of this discretization is a discrete output of estimated speed-up values 64.

Looking in more detail at the static analyzer 56, the static analyzer 56 may extract a number of static program properties 58 as will now be described with respect to the following code example using the provided line numbers. In these examples it will be assumed that loop trip count and branch prediction (values that are normally obtained only through dynamic analysis) are known. After this discussion, it will be explained how static analysis can be accomplished without dynamic measurement of these values.

EXAMPLE PROGRAM

1     START1
2        for ( i=0; i < num_elements; i++ ) { // N: 65536
3           START2

EXAMPLE PROGRAM

```
4       key = i; j = 0;
5       if (key == tree[0] ) { // P: 0.0000000001
6           found++;
7           continue;
8       }
9       for ( j = 0; j < depth---1; i++) { // N: 15
10          j = (j*2) + 1 + ( key > tree[j] ); // P: 0.499
11          if ( key == tree[j] ) { // P: 0.072
12              found++;
13              break;
14          }
15      }
16      STOP2
17  }
18  STOP1
```

In the above example which can be interpreted according to the conventions of the C programming language, N indicates the number of times the loop is executed (tripcount) and P indicates the probability of the branch being taken (branch probability). This information cannot be determined statically but is used for the purpose of the following explanation. As will be discussed below, the present inventors have determined that the values of N and P can be undetermined while still allowing the static analysis of the present invention to operate practically.

In order to be used as an unpaired target program 34, the code must be marked, for example, by the programmer, with preassigned delimiters. In this case delimiters include first region markers START 1 and STOP 1 and second region markers START 2 and STOP 2. The first region markers enclose the code that will be mapped to the new architecture. The second region markers enclose a region of the supported code that is intended to be a thread. The use of two levels of region markers allows the programmer to adjust the parallelism in the ported program.

Memory Coalescing

As indicated by process block 63, the unpaired target program 34 may be analyzed to evaluate static program property 58 of memory coalescing exhibited by the unpaired target program 34. Memory coalescing generally indicates how efficiently data can be transferred from an external memory system 22 to the processor registers and thus represents a measurement of memory bandwidth utilization. This value may be discretized into high or low memory coalescing (a binary value) with low memory coalescing being indicated if any memory operation in the unpaired target program 34 exhibits low coalescing.

Low memory coalescing may be construed as any pattern of memory access other than:
(1) those using an address based on the loop induction variable (i and j in the above example) without multiplication or being combined with anything other than a loop invariant term; and
(2) those using an address that contains only loop-invariant terms.

In the above example the memory access "tree[0]" has high memory coalescing because it uses a loop-invariant address. However, "tree[j]" is low memory coalescing because j is the loop index variable multiplied by three. This static program property 58 only has two values per the discretizer 60 and thus does not require special determination of a range threshold.

Branch Divergence

As indicated by process block 67, the unpaired target program 34 may also be analyzed with respect to branch divergence, this being a measure of how consistently a given branch instruction is taken and thus how effectively parallel resources on a GPU can be utilized. Branch divergence is generally not desired for GPU execution. Branch divergence for unpaired target program 34 may be calculated by considering successive windows of thirty-two branch decisions. If all the branch decisions within a window are taken or non-taken, the window is nondiverging, otherwise it is diverging. Branch divergence may then be defined as the ratio of the number of windows having at least one diverging instruction to the total number of windows. If the ratio is below 0.001, for example, as implemented by the discretizer 60), branch divergence is considered low, otherwise it is considered high (a binary value).

Whether a given branch is considered to be diverging is determined by classifying the branches into three types:
(1) branches that are loop-invariant (for example, based on a constant value), where branch divergence for these branches would be 0% or low;
(2) branches that are indexed by loop induction variable (e.g., i, j) where the branch pattern is statically analyzable as to whether it is divergent or not; and
(3) branches that are data-dependent (require access to external memory system 22) and where the branch pattern can not be statically determined.

In this latter case (3), the branch probability could be provided by the user as a proxy of branch divergence. To estimate branch divergence from branch probability, a minimum value of the probability p or 1-p is determined and multiplied by the window size of thirty-two. The result is capped to 1 if it goes above 1. In the example, the branch probability is $1 \times 10e{-}10$ for the first branch (line 5) making a branch divergence of 3.2e-9 so its divergence is low (less than 0.001); the second branch (line 10) has a probability of 0.499 so the branch divergence is one (15.9>0.001) so its divergence is high. In the third branch (line 11) the probability of the third branch being taken is 0.072. Here again the branch divergence is one (2.3>0.001) so its divergence is high. The present invention can also work without a provided estimate for branch divergence as will be discussed below.

Kernel Size

As indicated by process block 68, kernel size is defined as the average number of instructions within one thread (defined between the START 2-STOP 2 markers discussed above). This value is obtained statically by weighting each instruction by its expected relative occurrence which is the product of loop trip counts of all loops that enclose the instruction and the branch probability of the control statements of those loops. In one embodiment a threshold of 70 may be used by the discretizer 60 to make this static measurement a binary value.

In the example provided above, the first branch instruction (line 5) rarely occurs and therefore its instructions can be ignored as having low expected relative occurrence. The second branch instruction includes eight instructions: one shift, three additions, three comparisons, and one load operation with a relative expected occurrence of 15 providing 90 effective instructions even ignoring the third loop. Accordingly the kernel size would be high.

Arithmetic Intensity

As indicated by process block 71, arithmetic intensity is a measure of the prevalence of arithmetic operations that can hide memory latency issues and is defined in one embodiment as the ratio of the number of arithmetic operations to the number of memory operations in the unpaired target program 34. To estimate this value statically, each memory operation and each arithmetic operation is weighted by its expected relative occurrence. If the resulting ratio of these weights is below one, this value is considered low if. If the resulting ratio is above five it is considered high (by the discretizer 60), otherwise it is considered medium (a ternary value).

In the example code above, this ratio is slightly above five so that arithmetic intensity is high. The second loop includes eight operations including seven arithmetic instructions and one memory access instruction with an expected relative occurrence of 15 (15*7). Then there is one more addition instruction with an expected occurrence of approximately one (15×0.072); therefore, the arithmetic to memory instruction ratio is (15*7+15*0.072)/15*1 which is about seven so the arithmetic intensity is high in this example.

Available Parallelism

Per process block 72, available parallelism may be measured as an indication of how many threads can potentially run in parallel on a GPU. This value may be estimated statically by multiplying the loop trip count of all the loops that are within the first code region (START 1-STOP 1). If this number is above 1048576 parallelism is considered to be high, otherwise it is low per the discretization of discretizer 60. In the above example, there is one loop within this region having a loop trip count of 65536. This loop trip count number is below 1048576 and accordingly available parallelism is considered to be low. These two states are implemented by the discretizer 60. As will be discussed, the loop trip count value (normally determined dynamically) need not be directly measured on the dynamically executing program.

Control Intensity

Per process block 74, control intensity may be measured as an indication of how control intensive the code is. If there are no data-dependent control statements, the code is considered to have low control intensity otherwise it is considered to have high control intensity. Data-dependent means that the control instruction requires data from memory system 22. In the example code above, there are multiple data dependent control statements, for example, on lines 5, 10 and 11, so control intensity is high. This measure differs from branch divergence in that it considers data dependency rather than branch probability.

Mathematical Instruction Intensity

As indicated by process block 76, a static measurement may be made of how effectively special arithmetic function boxes on a GPU are utilized including those processing multiplication/division, single precision floating-point sine and cosine calculations, log/exponent and square root operations. Each of these types of arithmetic operations may be evaluated separately to produce a different static program parameter. For example, the number of instructions of each type maybe compared in a ratio to the total number of instructions.

To statically estimate the number of single precision, floating-point multiplication/division instructions, for example, these instructions may be classified into two groups: (1) instructions where all operands are loop-invariant and (2) instructions where one of the operands is not loop invariant. The first type of instructions (1) is not counted and the second type of instructions (2) is counted reflecting the fact that the first type of instructions is not advantageously executed by special function circuits. Each counted instruction is weighted by its expected relative occurrence and then divided by the kernel size (described above) to find a ratio. The discretizer 60 sees if this number is less than 0.001, in which case this static parameter is considered low. Otherwise the static parameter is considered high. The example code shown above has no single precision floating-point multiplication or division or sine, cosine, log (floating point), exponent (floating point) and square root instruction so this number is low.

At the conclusion of the extraction of the static parameters discussed above, as applied to the discretizer 60, outputs of the discretizer 60 are provided to the model 54 which produces a multivalued speed-up estimate which is discretized by discretizer 62 to provide the speed-up value 64.

Branch Probability Information and Loop Trip Count Uncertainty

Figure 5:
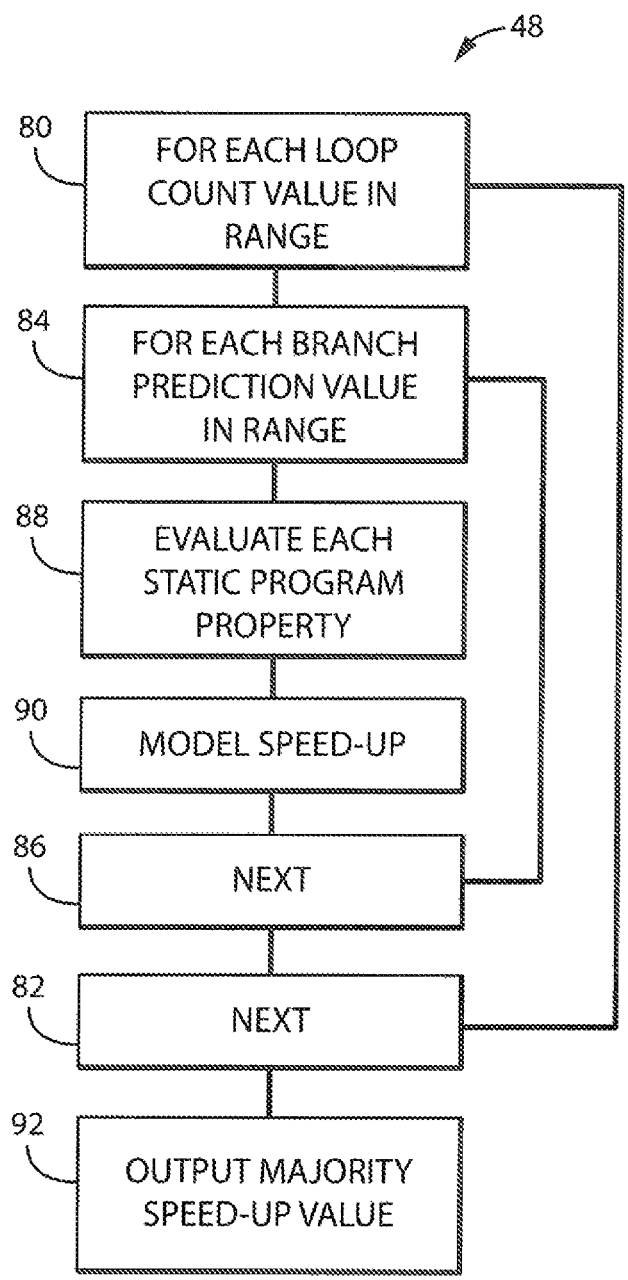
FIG. 5 is a flowchart showing a method of avoiding the need for dynamic measurements of branch prediction or loop trip count.

Referring now to FIG. 5, the above discussion of static analysis makes measurements that can require a value for branch probabilities and/or loop trip counts. As noted these values are generally known only when a dynamic study of the unpaired target program 34 is performed. Nevertheless, the present inventors have determined, empirically, that speed-up value can still be determined even when branch probability information and loop trip count is not known from direct dynamic measurement.

In one embodiment, the invention effectively selects branch probability information and loop trip count by sweeping through a range of values of branch probability and loop trip counts for each static program parameter calculated above to obtain a corresponding set of static parameters that are then modeled as discussed above to obtain a corresponding set of speed-up values. A majority prediction approach is then used to select one speed-up value from the many calculated speed-up values based on those speed-up values having the greatest occurrence during the sweeping process.

Specifically, referring to FIG. 5, a first loop comprised of process blocks 80 and 82 sweeps through a range of loop trip counts for the target program, for example, in 2000 logarithmically spaced steps from 1 to 2000. The next, inner loop formed from process blocks 84 and 86, sweeps through a range of branch prediction values, for example, from 0 to 100 percent in steps of 25. These branch predictions and loop trip count values within these loops are then applied, as indicated by process block 88, to determine the static program properties of the feature vector, for example, provided by process block 66. This feature vector for each loop iteration is provided to the model per process block 90 forming the modeling of model 54 to produce a speed-up value. Upon completion of the loops, all of the calculated speed-up values are evaluated at process block 92 and the speed-up value that has the most representations in all of the loop iterations is selected as the indicated speed-up value. The inventors have determined through analysis of the training set used for the machine learning of model 54 having actual dynamic measurements of branch prediction and loop trip count value, that this approach successfully predicts speed-up value with high reliability.

While the inventors do not wish to be bound by particular theory it is believed that the ability to use this technique for loop trip count values often results from the feature vector not changing even when the loop trip count changes because the loop covers a large percent of the kernel and thus the feature estimations which are mostly ratios are not affected. In some cases even feature vector changes that occur produce the same speed-up results.

This approach can be used when the user has no information about branch probability; however, it also contemplates that the user may provide input as to branch probability or branch probability range that can improve this calculation as noted above.

Figure 4:
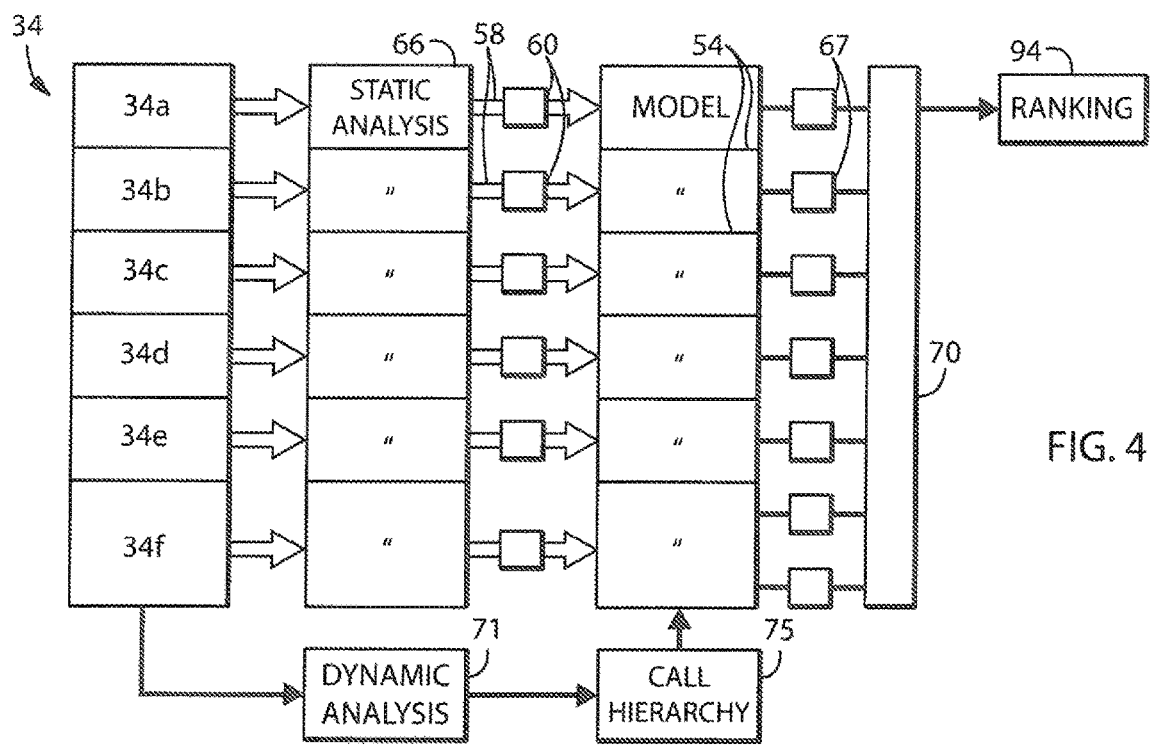
FIG. 4 is a process diagram showing the application of the static analysis of FIG. 3 to the task of ranking portions of a program to determine which portions should be ported first for greatest speed-up.

Referring now to FIG. 4, the ability to provide static analysis of code with respect estimating its speed-up when it is ported to a new architecture allows analysis to be performed on portions of the unpaired target program 34, for example, portions 34a-34f, when it would be difficult to dynamically execute these portions independently to obtain accurate dynamic measurements (both because of difficulty of executing the portions alone and the inevitable interaction of the portions with each other which would not be captured by independent dynamic execution). Even when analysis is intended to be performed on all portions 34a-34f, the ability to perform static analysis greatly reduces instrumentation costs.

In this case, each of the portions 34 may separately be statically analyzed by static analyzer block 66 and then discretized by independent discretizers 60. The output of the discretizers 60 for each static analyzer block 66 is then separately modeled using models 54 to produce outputs that are then again discretized using corresponding independent discretizers 62. These outputs may then be compared by a prioritizer 70 to determine a ranking 94, for example, of which portion of the unpaired target program 34 would likely provide the greatest feet-up benefit in being ported, thereby allowing either selective porting or a ranking of porting efforts.

In this case the models 54 may be informed by a call hierarchy 75 indicating interaction of the code portions 34a-f with respect to calls between the portions or the like. This call hierarchy 75 may require some dynamic analysis 77 and thus instrumentation of the unpaired target program 34, something that the static analysis otherwise is intended to avoid. However, this instrumentation is relatively simple and presents low overhead and in fact may be implemented by standard compilers.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic computer executing a program stored in a non-transitory medium to:
   (a) perform a static analysis of a target computer program prepared to execute on a first computer architecture to determine static properties of the target computer program selected from a set of static program properties relating to how the target computer program dynamically executes on a second computer architecture having a different architecture than the first computer architecture, wherein the static analysis inspects the target computer program without monitoring execution of the target computer program and does not resolve values accessed from memory or determine execution control flow that requires resolution of the direction of branch instructions that are memory dependent;
   (b) apply the static properties, exclusive of dynamic properties that can only be measured during execution of the target computer program on a computer, to a machine learning model, the machine learning model trained using a training set of programs each having a first optimization for the first computer architecture and a second optimization for the second computer architecture, wherein the first and second optimizations restructure the programs and data organization, the training set providing (1) an empirically measured change in execution speed between the first optimization and the second optimization when running on the respective computer architectures and (2) static properties of the set of static program properties of the first optimization; and
   (c) output a speed-up value from the machine learning model to a user, the speed-up value indicating an expected increase in execution speed of the target computer program when executed on the second computer architecture; and wherein the empirically measured changes in execution speed are discretized to a set of ranges selectable by the user and further wherein the speed-up value output to the user is discretized to the user-selected ranges.

2. The electronic computer of claim 1 wherein each of the static properties and training static properties are discretized to a corresponding sets of ranges less than five.

3. The electronic computer of claim 2 wherein the ranges are selected to provide bins holding equal numbers of the measured static properties of the training set of programs.

4. The electronic computer of claim 1 wherein the empirically measured changes in execution speed are discretized to a set of ranges less than five.

5. The electronic computer of claim 1 wherein the set of static program properties provides a static indication of memory coalescing in the target program related to an amount of access to external memory.

6. The electronic computer of claim 5 wherein the static indication of memory coalescing assesses memory access instructions in a loop according to whether an address of the instruction includes loop invariant terms or loop induction variable based terms that are not the loop induction variable times a value.

7. The electronic computer of claim 1 wherein the multiple static program properties further provide a static assessment, of an intensity of arithmetic instructions in the instructions of the target program.

8. The electronic computer of claim 7 wherein the static assessment of an intensity of arithmetic instructions is a ratio of arithmetic to memory access instructions.

9. The electronic computer of claim 7 wherein the static assessment of the intensity of arithmetic instructions is discretized to a binary value.

10. The electronic computer of claim 7 wherein the set of static program properties provides a static indication of branch divergence in the target program related to variation in execution paths between successive executions of a branch instruction.

11. The electronic computer of claim 1 wherein the set of static program properties further includes at least one of assessment of kernel size of an average number of instructions in one thread, available parallelism indicating how many threads can potentially run on the second architecture in parallel, control intensity providing a measure of whether control instructions rely on data from external memory and complex arithmetic ratios indicating the number of complex arithmetic instructions selected from the group of multiplication, division, sine, cosign, floating-point log, floating-point exponent and square root.

12. The electronic computer of claim 1 wherein the machine learning model is a random forest classifier.

13. The electronic computer of claim 12 wherein the random forest classifier selects and combines random forests of binary decision trees.

14. The electronic computer of claim 1 wherein the electric computer further includes each of the first and second architectures.

15. An electronic computer executing a program stored in a non-transitory medium to:
  (a) perform a static analysis of a target computer program prepared to execute on a first computer architecture to determine static properties of the target computer program selected from a set of static program properties relating to how the target computer program dynamically executes on a second computer architecture having a different architecture than the first computer architecture, wherein the static analysis inspects the target computer program without monitoring execution of the target computer program and does not resolve values accessed from memory or determine execution control flow that requires resolution of the direction of branch instructions that are memory dependent;
  (b) apply the static properties to a machine learning model, the machine learning model trained using a training set of programs each having a first optimization for the first computer architecture and a second optimization for the second computer architecture, wherein the first and second optimizations restructure the programs and data organization, the training set providing (1) an empirically measured change in execution speed between the first optimization and the second optimization when running on the respective computer architectures and (2) static properties of the set of static program properties of the first optimization;
  (c) output a speed-up value from the machine learning model to a user, the speed-up value indicating an expected increase in execution speed of the target computer program when executed on the second computer architecture; and
  wherein the set of static program properties provides a static indication of memory coalescing in the target program related to an amount of access to external memory; and wherein the static indication of memory coalescing assesses memory access instructions in a loop according to whether an address of the instruction includes loop invariant terms or loop induction variable based terms that are not the loop induction variable times a value; and
  wherein the static indication of memory coalescing is discretized to a binary value.

16. An electronic computer executing a program stored in a non-transitory medium to:
  (a) perform a static analysis of a target computer program prepared to execute on a first computer architecture to determine static properties of the target computer program selected from a set of static program properties relating to how the target computer program dynamically executes on a second computer architecture having a different architecture than the first computer architecture, wherein the static analysis inspects the target computer program without monitoring execution of the target computer program and does not resolve values accessed from memory or determine execution control flow that requires resolution of the direction of branch instructions that are memory dependent;
  (b) apply the static properties to a machine learning model, the machine learning model trained using a training set of programs each having a first optimization for the first computer architecture and a second optimization for the second computer architecture, wherein the first and second optimizations restructure the programs and data organization, the training set providing (1) an empirically measured change in execution speed between the first optimization and the second optimization when running on the respective computer architectures and (2) static properties of the set of static program properties of the first optimization;
  (c) output a speed-up value from the machine learning model to a user, the speed-up value indicating an expected increase in execution speed of the target computer program when executed on the second computer architecture; and wherein the multiple static program properties further provide a static assessment of an intensity of arithmetic instructions in the instructions of the target program; and wherein the set of static program properties provides a static indication of branch divergence in the target program related to variation in execution paths between successive executions of a branch instruction; and wherein the static indication of branch divergence assesses branch instructions in a loop according to whether the branch conditions are loop invariant terms or based on loop induction variables.

17. An electronic computer executing a program stored in a non-transitory medium to:
   (a) perform a static analysis of a target computer program prepared to execute on a first computer architecture to determine static properties of the target computer program selected from a set of static program properties relating to how the target computer program dynamically executes on a second computer architecture having a different architecture than the first computer architecture, wherein the static analysis inspects the target computer program without monitoring execution of the target computer program and does not resolve values accessed from memory or determine execution control flow that requires resolution of the direction of branch instructions that are memory dependent;
   (b) apply the static properties to a machine learning model, the machine learning model trained using a training set of programs each having a first optimization for the first computer architecture and a second optimization for the second computer architecture, wherein the first and second optimizations restructure the programs and data organization, the training set providing (1) an empirically measured change in execution speed between the first optimization and the second optimization when running on the respective computer architectures and (2) static properties of the set of static program properties of the first optimization;
   (c) output a speed-up value from the machine learning model to a user, the speed-up value indicating an expected increase in execution speed of the target computer program when executed on the second computer architecture; and wherein the multiple static program properties further provide a static assessment of an intensity of arithmetic instructions in the instructions of the target program; and wherein the set of static program properties provides a static indication of branch divergence in the target program related to variation in execution paths between successive executions of a branch instruction; and wherein the static indication of branch divergence assesses whether the branch instructions include branch conditions based on access to processor external memory.

18. An electronic computer executing a program stored in a non-transitory medium to:
   (a) perform a static analysis of a target computer program prepared to execute on a first computer architecture to determine static properties of the target computer program selected from a set of static program properties relating to how the target computer program dynamically executes on a second computer architecture having a different architecture than the first computer architecture,
   (b) apply the static properties to a machine learning model, the machine learning model trained using a training set of programs each having a first optimization for the first computer architecture and a second optimization for the second computer architecture, wherein the first and second optimizations restructure the programs and data organization, the training set providing (1) an empirically measured change in execution speed between the first optimization and the second optimization when running on the respective computer architectures and (2) static properties of the set of static program properties of the first optimization; and
   (c) output a speed-up value from the machine learning model to a user, the speed-up value indicating an expected increase in execution speed of the target computer program when executed on the second computer architecture, wherein the program is a portion of a main computer program and wherein the electronic computer includes the first architecture and further executes the program to:

execute the main program on the first architecture to measure a call hierarchy of different portions of the main program including the target program when the main program is executing on the first architecture;

perform a static analysis of the different portions of the main program to determine static properties of the each of the different portions selected from the set of static program properties;

apply the static properties of each of the different portions to the machine learning model; and provide a comparison of speed-up value from the machine learning model for each of the different portions to a user indicating a relative increase in execution speed of each of the different portions when executed on the second computer architecture.

19. A method of assessing effects of a computer architecture on program execution speed of a target program comprising the steps of:
   (a) performing a static analysis of the target computer program prepared to execute on a first computer architecture to determine static properties of the target computer program selected from a set of static program properties relating to how the target computer program dynamically executes on a second computer architecture having a different architecture than the first computer architecture, wherein the static properties are selected from the group consisting of static measurements of memory coalescing, intensity of arithmetic instructions, branch divergence of branch instructions, kernel size, available parallelism control intensity, and amount of complex arithmetic including multiplication, division, sine, cosine, floating-point log, floating-point exponent and square root;
   (b) applying the static properties, exclusive of dynamic properties that can only be measured during execution of the target computer program on a computer, to a machine learning model, the machine learning model trained using a training set of programs each having a first optimization for the first computer architecture and a second optimization for the second computer architecture, wherein the first and second optimizations restructure the programs and data organization, the training set providing an empirically measured change in execution speed between the first optimization and the second optimization when running on the respective computer architectures and training static properties of the set of static program properties for the first optimization; and (c) outputting a speed-up value from the machine learning model to a user, the speed-up value indicating an expected increase in execution speed of the target computer program when executed on the second computer architecture; and wherein the empirically measured changes in execution speed are discretized to a set of ranges selectable by the user and further wherein the speed-up value output to the user is discretized to the user-selected ranges.

* * * * *